United States Patent [19]

Mori et al.

[11] 4,400,062
[45] Aug. 23, 1983

[54] WAVE PLATE RETARDER

[75] Inventors: Hiroshi Mori, Matsudo; Mikio Sugiki, Tokyo, both of Japan

[73] Assignee: Sony Corporation, Tokyo, Japan

[21] Appl. No.: 74,308

[22] Filed: Sep. 11, 1979

[51] Int. Cl.³ .............................................. G02B 1/24
[52] U.S. Cl. ..................................... 350/406; 356/365
[58] Field of Search ............... 350/157, 400, 403, 406; 356/32, 33, 35, 364, 365, 367

[56] References Cited

U.S. PATENT DOCUMENTS

3,969,573  7/1976  Bouwhuis et al. ................... 350/157
4,035,083  7/1977  Woodriff et al. .................... 356/367

OTHER PUBLICATIONS

Heywood, R. B. *Photoelasticity for Designers* ©1969, Pergamon Press. Oxford, p. 48.
Redner, S. "New Automatic Polariscope System" *Experimental Mechanics* vol. 14, No. 12 (Dec. 1974) pp. 486–491.

*Primary Examiner*—R. A. Rosenberger
*Attorney, Agent, or Firm*—Lewis H. Eslinger; Alvin Sinderbrand

[57] ABSTRACT

A wave plate retarder consists of a stacked plurality of doubly refracting or birefringent high molecular films laminated with a predetermined angle between their respective optical axes to establish a desired phase difference during transmission through the films of components of light polarized along orthogonal axes. The predetermined angle may be selected to provide a phase difference of ¼ or ½ wavelength of light to thus produce a composite wave plate retarder which functions as a ¼ or ½ wavelength plate regardless of the phase difference of components of light produced by transmission through a single film.

2 Claims, 19 Drawing Figures

WAVE PLATE RETARDER

BACKGROUND OF THE INVENTION

The present invention relates generally to a wave plate retarder, and is directed more particularly to a ½ wavelength plate or ¼ wavelength plate used, for example, in a reproducing (pick-up) apparatus of an optical video disc.

In a reproducing apparatus for an optical video disc, an apparatus is known in which light from a laser is impinged on a signal track recorded on the video disc. The reflected laser light therefrom, which is modulated by recorded pits in the signal track, is detected, and the recorded signal is read out. In order that the laser light reflected from the video disc is effectively introduced to its detector and to avoid the reflected laser light returning to its source and causing noise, a combination of a ¼ wavelength plate and a polarizing beam splitter is used to effectively separate the laser light reflected from the video disc from the incoming light path.

Any suitable birefringent material such as, for example, mica, rock crystal or high molecular film may be used to make a ¼ or ½ wavelength plate. Unfortunately, mica and rock crystal are rather expensive and, while high molecular film is relatively inexpensive, it normally has unstable characteristics. High molecular films, such as for example, polypropylene film which has been elongated by being stretched during manufacture on an elongation roll, has an optical axis which is aligned with the longitudinal direction of stretch of the film. Such a high molecular film has birefringent or double-refractive properties. A material having birefringent properties has different refractive indexes and light transmission speeds for light polarized in different, usually orthogonal, directions. When a beam of light is passed through a birefringent material normal to its optical axis, the birefringent material breaks up the light into an ordinary ray and an extraordinary ray which travel through the material at different speeds. It is a further property of birefringent material that the oridinary ray and the extraordinary ray are linearly polarized in mutually perpendicular directions. If the thickness of a high molecular film can be selected such that one of the rays passing through the film is retarded by a ¼ or ½ wavelength relative to the other ray, the resulting phase difference (retardation $\Gamma$) between the two rays is 90° or 180° respectively.

In practice, however, it is difficult to control the thickness of stretched high molecular films accurately enough to use them for ¼ wavelength or ½ wavelength plates. Even if the thickness could be controlled with sufficient accuracy, the birefringent properties of the material are not uniform from lot to lot due to unavoidable differences in composition and manufacturing conditions between lots. It is therefore so difficult to select or to manufacture high molecular films having a desired phase difference $\Gamma$ for a particular wavelength of light that such high molecular films are not widely used and cannot be manufactured inexpensively.

OBJECTS AND SUMMARY OF THE INVENTION

Accordingly, it is an object of the present invention to provide a novel wave plate retarder made of high molecular film.

Another object of the invention is to provide a wave plate retarder having a desired phase difference $\Gamma$, for example, a ¼ wavelength plate wherein $\Gamma = 90°$ or a ½ wavelength plate wherein $\Gamma = 180°$.

A further object of the invention is to provide a ½ wavelength plate made of high molecular film which can be easily and inexpensively mass produced.

According to the present invention, a composite wave plate retarder is provided having the characteristics of a ¼ or ½ wavelength plate which may be formed using a plurality of stacked double refracting high molecular films. The phase retardation of individual films making up the ¼ wavelength plate need not be the same as the retardation of the composite wave plate retarder. A number of wave plate retarders may be produced based on a single measurement of the lot of high molecular film from which the stacked films are cut, thus permitting inexpensive mechanical mass production of a large number of wave plate retarders.

According to an aspect of the invention, there is provided a method of making a wave plate retarder comprising the steps of placing a film of birefringent material having an optical axis with its surface normal to a linearly polarized beam of light, rotating the film about an axis parallel to the beam of light, measuring a linearly polarized component of the beam of light after passing through the film, calculating a retardation phase angle based on the measuring step, forming at least two sheets each having optical axes from the film, and overlapping the at least two sheets with an angle between their optical axes such that a wave plate retarder is formed having a retardation of an integral multiple of ¼ wavelength.

According to a feature of the invention, a wave plate retarder is provided having a transmission along a slow axis which is slow relative to transmission along a fast axis orthogonal to the slow axis comprising a first sheet of birefringent high molecular film having a first optical axis, at least a second sheet of birefringent high molecular film having a second optical axis, the first and at least a second sheets being stacked to form the wave plate retarder, and the first and second optical axes being angularly displaced from each other whereby the retardation of the wave plate retarder along the slow axis relative to the fast axis is an integral multiple of ¼ wavelength of light.

The above, and other objects, features and advantages of the present invention will become apparent from the following description read in conjunction with the accompanying drawings in which like reference numerals designate the same elements.

DETAILED DESCRIPTION OF THE PREFERRED EMBODIMENT

Figure 1:
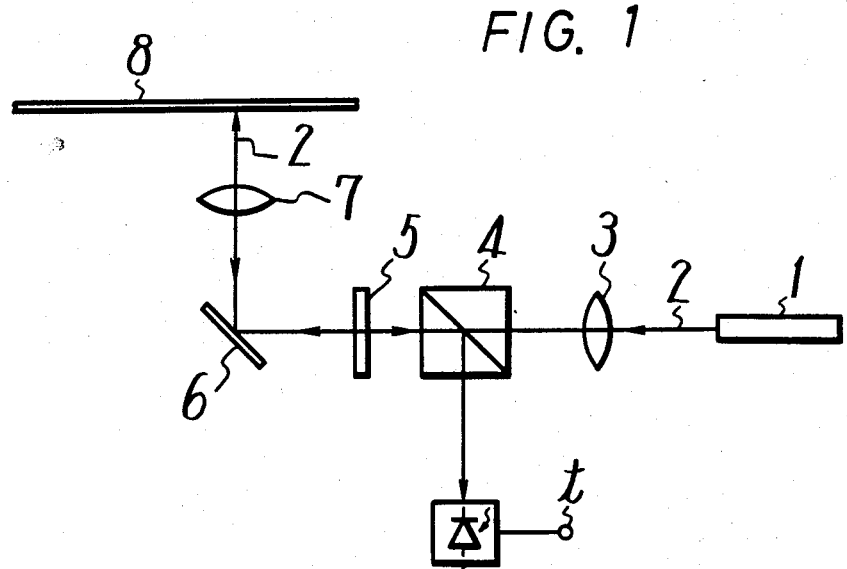
FIG. 1 is a schematic diagram showing a reproducing apparatus for an optical video disc in which a wave plate retarder according to an embodiment of the present invention may be used.

Before describing the present invention, a description of conventional apparatus in which a wave plate retarder according to an embodiment of the present invention may be used is given with reference to FIG. 1. A beam of laser light 2 emitted from a Ne-He laser tube 1 is introduced through a lens system 3, a beam splitter 4, a wave plate retarder having characteristics of a ¼ wavelength plate 5, a mirror 6 and an objective lens system 7 onto a signal track formed on a video disc 8. Beam splitter 4 is conventionally a polarizing beam splitter which transmits light which is linearly polarized in a first direction, normal to the page in FIG. 1, and reflects light which is linearly polarized perpendicular to the first direction. The light reaching ¼ wavelength plate 5 is linearly polarized along an axis normal to the page. The optical axis of ¼ wavelength plate 5 is disposed 45° to the axis of polarization of the linearly polarized light from beam splitter 4. As is well known, the output of ¼ wavelength plate 5 is circularly polarized light having right circular or left circular polarization. The light beam 2 reflected from and modulated by recorded pits (not shown) in a signal track on video disc 8 returns through objective lens system 7, mirror 6 and ¼ wavelength plate 5 to beam splitter 4. Upon its reflection from video disc 8, the "handedness" of light beam 2 is reversed. That is, if the impinging light beam is right handed, the reflected light beam is left handed. When the reflected light beam passes through ¼ wavelength plate 5, the circularly polarized reflected light is reconverted to linearly polarized light but with its axis of polarization at 90° to the axis of polarization of light beam 2 originally applied to ¼ wavelength plate 5 from beam splitter 4. Since the reflected light enters beam splitter 4 with its polarization axis rotated 90°, it is unable to pass in a straight line through beam splitter 4, but instead is reflected 90° onto detector 9 which may be, for example, a photodiode. The signal recorded on video disc 8 is thus read out as an electric signal which is delivered to an output terminal t.

Figure 2:
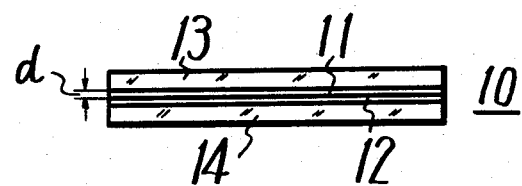
FIG. 2 is an enlarged cross-sectional view showing an example of a wave plate retarder according to an embodiment of the present invention.

Referring now to FIG. 2, there is shown a ¼ wavelength plate 10 according to the present invention which can be used as the ¼ wavelength plate 5 in the apparatus of FIG. 1. Two films 11 and 12 are prepared from high molecular film taken from the same lot. Films 11 and 12 have thickness d and a maximum refractive index $n_o$ for the ordinary ray and a minimum refractive index $n_e$ for the extraordinary ray along orthogonal axes as previously described. Films 11 and 12 are stacked or overlapped with a predetermined angle between their optical axes, and are optionally protected by being encased between two protective plates 13 and 14. Protective plates 13 and 14 may be bonded by adhesive or supported as a unitary body by a frame (not shown) to form a ¼ wavelength plate 10. Protective plates 13 and 14 are made of glass, resin or the like through which a light having the wavelength used in optical video disc reproduction can pass without double refraction. The use of high molecular films 11 and 12 from the same lot ensures that, even though it is difficult to produce high molecular film with precise thickness and optical properties, the two films 11 and 12 will have the same thickness and optical properties which permits them to be combined into a composite wave plate retarder according to the teaching of the present invention.

The following paragraphs describe how the optical properties of a single sheet of high molecular film are measured. The manner in which the measured optical properties are used to construct a ¼ wavelength plate 10 employing two high molecular films 11 and 12 is described later herein.

When a sheet of high molecular film transmits light of a particular wavelength λ, components of the light polarized parallel to the direction of the maximum refractive index $n_o$ are transmitted at a different speed from components of the light polarized parallel to the direction of the minimum refractive index $n_e$. Thus, when the two components of light emerge from the film, a phase difference Γ exists between them which is proportional to the difference between the refractive indices and the distance the light travelled through the film. The relationship is given by the following well known equation:

$$\Gamma = \frac{2\pi}{\lambda} (n_o - n_e) d \qquad (1)$$

where d=distance.

Figure 3:
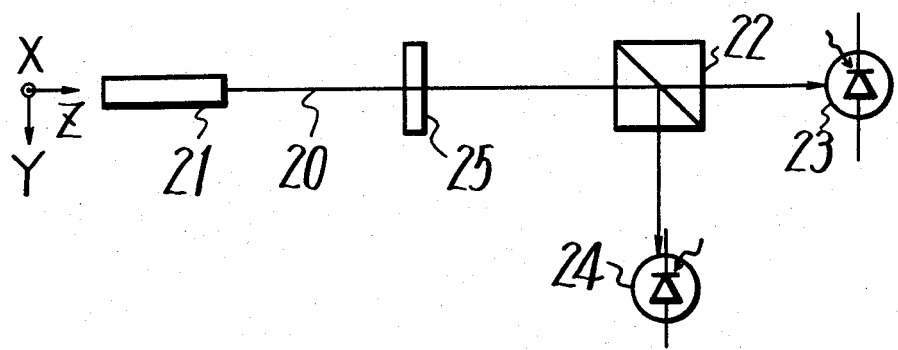
FIG. 3 is a schematic diagram showing an apparatus for measuring the phase difference of the ordinary and extraordinary ray propagated through a single sheet of high molecular film.

The method of measuring the phase difference Γ of a film sheet is described with reference to FIG. 3. A light source 21, such as a laser tube, a semiconductor laser or the like is provided from which linearly polarized laser light 20 is emitted using, for example, a polarizing plate (not shown). A polarizing beam splitter 22 is located on the light path axis Z of linearly polarized laser light 20 from light source 21. A first detector 23 including, for example, a photo-diode, is provided coaxial with laser light 20 to receive light transmitted through polarizing beam splitter 22. A second detector 22 may optionally be provided to receive light reflected by polarizing beam splitter 22. Polarizing beam splitter 22 has its axis of polarization aligned with the axis of polarization of linearly polarized laser light 20 and functions to transmit therethrough the components of linearly polarized laser light 20 from light source 21 and to reflect the component of light having a polarization at right angles to its axis of polarization.

A film 25 cut from a high molecular film sheet, whose phase difference $\Gamma$ is to be measured, is prepared with a mark thereon to indicate the longitudinal direction of the film sheet. Film 25 is located on the axis Z between light source 21 and polarizing beam splitter 22 such that the surface of film 25 intersects the axis Z at right angles. The direction perpendicular to the surface of the page of FIG. 3 is taken as the X direction and the downward direction as the Y direction. Film 25 is supported so that it can be rotated about the Z-axis such that an angle $\theta$ between the direction therein having a refractive index $n_o$ and Y-axis may be varied from 0° to 360°. The linearly polarized laser light 20 from light source 21 is assumed to be a wave vibrating in the Y-axis direction, and having an amplitude value E on the Y-axis. If it is assumed that the amplitude components of linearly polarized laser light 20 along the axes which show the refractive indices $n_o$ and $n_e$ after linearly polarized laser light 20 passes through film 25 are taken as $E_o$ and $E_e$, these amplitude components $E_o$ and $E_e$ are expressed as follows:

$$E_o = E \cos \theta \cdot e^{j\phi_o} \quad (2)$$

$$E_e = -E \sin \theta \cdot e^{j\phi_e} \quad (3)$$

Where:
$e^{j\phi_o} = (\cos \phi_o + i \sin \phi_o)$ and
$e^{j\phi_e} = (\cos \phi_e + i \sin \phi_e)$
represent the phases of the light wave immediately after the light passes through film 25 (the path lengths of the light through film 25 measured in wavelengths), and E $\cos \theta$ and $-E \sin \theta$ represent the amplitudes of the light wave, respectively. Accordingly, $E_o$ and $E_e$ represent the effective amplitudes of the light wave immediately after passing through film 25. In equations (2) and (3), $\phi_o$ and $\phi_e$ are expressed as follows:

$$\phi_o = \frac{2\pi}{\lambda} n_o \cdot d$$

$$\phi_e = \frac{2\pi}{\lambda} n_e \cdot d.$$

The phase difference $\Gamma$ is $\phi_o - \phi_e$ as used in equation (1).

An amplitude component $E_T$ of laser light 20 in the Y-axis direction, which passes through polarizing beam splitter 22 and arrives at first detector 23, is given by the following expression:

$$E_T = E_o \cos \theta - E_e \sin \theta \quad (4).$$

If equations (2) and (3) are substituted into equation (4), the latter is rewritten as follows:

$$E_T = (E \cos \theta \cdot e^{j\phi_o}) \cos \theta - (-E \sin \theta \cdot e^{j\phi_e}) \sin \theta \quad (4')$$

-continued
$$= (E \cos^2 \theta \cdot \cos \phi_o + E \sin^2 \theta \cdot \cos \phi_e) +$$
$$i (E \cos^2 \theta \cdot \sin \phi_o + E \sin^2 \theta \cdot \sin \phi_e)$$

The energy $I_T$ of component $E_T$ is expressed as follows:

$$I_T = |E_T|^2 \quad (4'')$$
$$= (E \cos^2 \theta \cdot \cos \phi_o + E \sin^2 \theta \cdot \cos \phi_e)^2 +$$
$$(E \cos^2 \theta \cdot \sin \phi_o + E \sin \theta \cdot \sin \phi_e)^2$$
$$= E^2[1 - 2 \sin^2 \theta \cdot \cos^2 \theta \{1 - (\cos \phi_o \cdot \cos \phi_e - \sin \phi_o \cdot \sin \phi_e)\}]$$
$$= E^2[1 - \tfrac{1}{2} \sin^2 2\theta \{1 - \cos (\phi_o - \phi_e)\}]$$
$$= E^2\{1 - \tfrac{1}{2} \sin^2 2\theta (1 - \cos \Gamma)\}$$

Accordingly, an output $I_{out}$ from the first detector 23 is expressed by the following equation:

$$I_{out} = I_T \alpha 1 - \tfrac{1}{2} \sin^2 2\theta (1 - \cos \Gamma) \quad (5).$$

When $\theta = 45°$ is substituted into equation (5), the output $I_{out}$ given by equation (5) is a minimum output $(I_{out})$ min, while when $\theta = 0°$ is substituted into equation (5), the output $I_{out}$ given thereby is a maximum output $(I_{out})$ max, respectively. Thus, a ratio R of both the outputs is given as follows:

$$R = \frac{(I_{out}) \min}{(I_{out}) \max} = \tfrac{1}{2} (1 + \cos \Gamma) \quad (6)$$

Therefore, if the relationship between the rotation angle $\theta$ and output $I_{out}$ is measured by first detector 23 and then the maximum and minimum outputs $(I_{out})$max and $(I_{out})$min are obtained, the phase difference $\Gamma$ is obtained from equation (6). When film 25 is a ¼ wavelength plate, $\Gamma = 90°$ and $R = \tfrac{1}{2}$. When film 25 is a ½ wavelength plate, $\Gamma = 180°$ and $R = 1$.

As set forth above, the phase difference $\Gamma$ of film 25 can be measured. According to the present invention, first and second films 11 and 12, each made of measured film 25, are overlapped with a predetermined angle between their optical axes to provide a ¼ wavelength plate 10.

Figure 4:
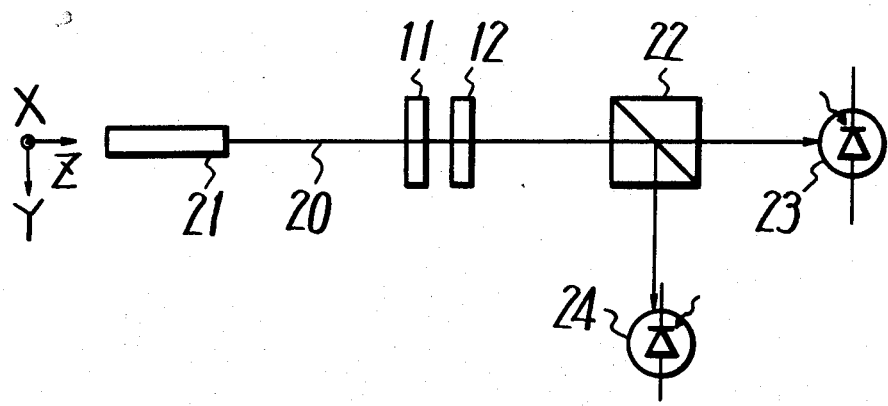
FIG. 4 is a schematic diagram showing an apparatus for measuring the characteristics of a pair of sheets of high molecular film having their optical axes at various angles to each other.

The manner in which the angle $(\zeta - \theta)$ between the optical axes of first and second films 11 and 12 is established to produce a ¼ or ½ wavelength plate is described in the following with reference to FIG. 4. Films 11 and 12 are stacked and rotatably located in the light path of laser light 20 between light source 21 and polarizing beam splitter 22. The angles between the optical axes of first and second films 11 and 12 in the Y-axis are assumed to be $\theta$ and $\zeta$. The energy $I_T$ of polarized laser light 20, which passes through polarizing beam splitter 22 and arrives at first detector 23, is expressed as follows:

$$I_T = E^2[\cos^4 (\zeta - \theta) + \sin^4 (\zeta - \theta) + 2 \cos \Gamma \cdot \sin^2 (\zeta - \theta)$$
$$\cos^2 (\zeta - \theta) - \tfrac{1}{2} \{\cos 2(\zeta + \theta) - \cos 2 (\zeta - \theta)\} \cos^2$$
$$(\zeta - \theta)(\cos 2\Gamma - 1) \quad (7).$$

When first and second films 11 and 12 are rotated about the Z-axis while their angle difference $(\zeta - \theta)$ is held constant at a predetermined value, only the term $\cos^2 (\zeta + \theta)$ of equation (7) is varied. In order to obtain the maximum and minimum values of the energy when both the films 11 and 12 are rotated about the Z-axis, equation (7) is differentiated with respect to $\zeta$ so that an angle which will make the differentiated value zero can be calculated. If it is assumed that $\zeta - \theta = C$ (constant), the following equation is derived from equation (7):

$$\frac{dI_T}{d\rho} = E^2 \cos^2 C \,(\cos 2\rho - 1) \sin (4\rho - 2C) = 0.$$

Accordingly, $\sin (4\zeta - 2C) = \sin 2 (\zeta + \theta) = 0$. Thus, when $2 (\zeta + \theta)$ is 0 or $\pi$, the energy $I_T$ becomes maximum or minimum. At this time, $\cos 2 (\zeta + \theta)$ becomes $\pm 1$. If this relationship is substituted into equation (7), minimum or maximum value $I_T(\min)$ or $I_T(\max)$ of energy $I_T$ can be obtained as follows:

$$I_T(\min) \text{ or } I_T(\max) = E^2[\cos^4 (\zeta - \theta) + \sin^4 (\zeta - \theta) + 2 \cos \Gamma \cdot \sin^2 (\zeta - \theta) \cos^2 (\zeta - \theta) - \tfrac{1}{4} \{\pm 1 - \cos 2 (\zeta - \theta)\} \cos^2 (\zeta - \theta) \times (\cos^2 \Gamma - 1)] \quad (8)$$

In this case, $\cos^2 (\zeta - \theta) > 0$, $|\cos 2\Gamma| < 1$ or $\cos 2\Gamma - 1 < 0$, and $\cos^2 (\zeta - \theta) (\cos 2\Gamma - 1) > 0$.

From the above, it will be apparent that the minimum value $I_T(\min)$ is obtained when $\cos 2 (\zeta + \theta) = -1$ and hence is expressed as follows:

$$I_T(\min) = E^2[\cos^4 (\zeta - \theta) + \sin^4 (\zeta - \theta) + 2 \cos \Gamma \cdot \sin^2 (\zeta - \theta) \cos^2 (\zeta - \theta) + \tfrac{1}{2} \{1 + \cos 2(\zeta - \theta)\} \cos^2 (\zeta - \theta)(\cos 2\Gamma - 1)] \quad (8')$$

If $\zeta - \theta = C$ is substituted into the equation (8') and rearranged, the following equation is obtained.

$$I_T(\min) = E^2[(\tfrac{1}{2} \cos 2\Gamma - 2 \cos \Gamma + 3/2) \cos^4 C + 2 (\cos \Gamma - 1) \cos^2 C + 1] \quad (9)$$

The maximum energy $I_T(\max)$ becomes equal to $E^2$ if optical loss is neglected.

Accordingly, the ratio R between the minimum and maximum values $I_T(\min)$ and $I_T(\max)$ is expressed as follows:

$$R = \frac{I_T(\min)}{I_T(\max)} = (\tfrac{1}{2} \cos 2\Gamma - 2 \cos \Gamma + 3/2)\cos^4 C + 2 (\cos \Gamma - 1) \cos^2 C + 1. \quad (10)$$

As described in connection with equation (6), the condition for a ¼ wavelength plate is $R = \tfrac{1}{2}$. Therefore, for a composite wave plate retarder consisting of stacked films 11 and 12 to be a ¼ wavelength plate, it is necessary that the value of C i.e., the angle $\zeta - \theta$ between the optical axes of films 11 and 12 must satisfy $R = \tfrac{1}{2}$ in equation (10). That is, if the above is satisfied, a composite wave plate retarder is a ¼ wavelength plate.

Now, when equation (10) is set equal to ½ and solved, $$R = ((\tfrac{1}{2} \cos 2\Gamma - 2 \cos \Gamma + 3/2) \cos^4 C + 2 (\cos \Gamma - 1) \cos^2 C + 1) = \tfrac{1}{2}.$$

$$\cos^2 C = \frac{1 \pm \frac{\sqrt{2}}{2}}{1 - \cos \Gamma} \quad (11)$$

where $\cos \Gamma \leq \frac{1}{\sqrt{2}}$.

Since the value of $\Gamma$ is determined from equation (6) and the value of R is known from measurement of film 25, the value C necessary to produce a ¼ wavelength plate may be determined by substituting the value of $\Gamma$ into equation (11). Thus, a composite $\theta$ wavelength plate consisting of two stacked films 11 and 12 can be formed according to the present invention, by properly selecting the angle $(\zeta - \theta)$ between the optical axes of two films 11 and 12, irrespective of the value $\Gamma$ of the films.

The above example assigns a value to R in equation (10) of ½ and hence produces a ¼ wavelength plate. However, if a value of C is chosen which makes R in equation (10) equal to 1, a ½ wavelength plate is produced.

Two examples of the manner in which the invention was employed are described in the following. In each example, a ¼ wavelength plate for linearly polarized laser light with a wavelength λ of 8300 A is desired.

EXAMPLE 1

Figure 5:
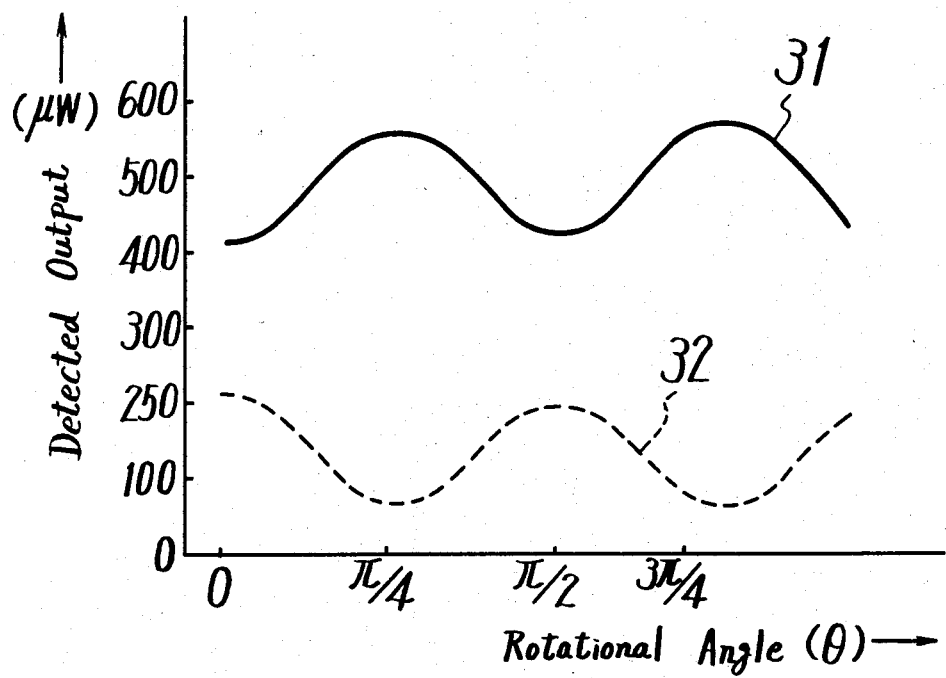
FIG. 5 is a graph showing outputs measured with the apparatus of FIG. 3.

A high molecular film sheet, identified as P2262 (polypropylene sheet), having a thickness of 15 μm and made by Toyo Spinning Co., Ltd., was used. A film 25 to be measured was cut from a high molecular film sheet, and was located in the apparatus of FIG. 3. Light source 21 was a semiconductor laser source, operative to generate laser light at a wavelength λ of 8300 A. Film 25 was rotated about the Z-axis, and the angle between the Y axis and the optical axis of film 25, and the outputs from detectors 23 and 24 were measured. The measured results are shown in curves 31 and 32 of FIG. 5. Solid line curve 31 is the output from first detector 23 and dashed line curve 32 is the output from second detector 24, respectively.

From curve 31, it is found that the maximum and minimum outputs from first detector 23 were 560 μW and 430 μW, respectively. However, it is also seen from curve 32 that the minimum output from second detector 24 was 60 μW. In general, it is known that polarizing beam splitter 22 transmits the component of incident light which is polarized parallel to a surface determined by the incident and reflecting light paths, (called a P-wave), and reflects the component of incident light, which is polarized in a direction perpendicular to the above surface (called an S-wave). For linearly polarized light, a maximum transmitted value of light should coincide with zero reflected light. Since the reflected component detected by second detector 24 never fell to zero, an unpolarized component must have existed in laser light 20.

Laser light source 21 used in this example was a semiconductor laser source. In general, it is known that a semiconductor laser source operates in an unpolarized light-emitting diode mode at low drive currents and begins to operate in the laser mode only when its drive current exceeds a predetermined value. Accordingly, the detected value of output power of a semiconductor laser source includes an unpolarized LED component as well as a polarized laser light component. Since the minimum detected value of reflected light was 60 μW, it was deduced that this amount, due to unpolarized LED emission, was included in the 560 μW transmitted light. When this LED component was subtracted from the measured transmitted values, the actual transmitted maximum and minimum outputs due to polarized laser light were expressed as follows:

$$(I_{out})max = 560 \mu W - 60 \mu W;$$

$$(I_{out})min = 430 \mu W - 60 \mu W.$$

The above values were substituted into equation (6) and a phase difference $\Gamma$ of 42° was calculated (cos $\Gamma = 0.48$). When this value was substituted into equation (11), a value of C i.e. $(\zeta - \theta)$ required to produce a ¼ wavelength plate, was calculated to be 41.2°.

First and second films 11 and 12 were cut from the above measured high molecular film 25, and were overlapped or laminated in such a manner that the angle between their optical axes was successively established at angles of 0°, 30°, 40°, 50°, 60°, 70°, 90°, and 120°. Optical properties of the resulting stacks were measured by rotating each one about the Z axis in the apparatus of FIG. 4. The measured results are shown in the graphs of FIGS. 6-13 respectively. In the graphs of FIGS. 6-13, the solid line curves represent the outputs of first detector 23 i.e., the amount of light which is transmitted through polarizing beam splitter 22, and the dashed line curves represent the outputs from second detector 24, i.e., the amount of light which is reflected by polarizing beam splitter 22. As is clear from the graph of FIG. 8, when the angle between the optical axes of films 11 and 12 is 40° (near the calculated angle 41.2°), the minimum value of the light transmitted through polarizing beam splitter 22, which occurs at an angle of $\pi/4$, is approximately coincident with the maximum value of light reflected by polarizing beam splitter 22 as indicated by the solid and dashed line curves respectively. This indicates that the linearly polarized laser light from light source 21 is subjected to circular polarization by the composite wave plate retarder consisting of films 11 and 12. That is, the composite wave plate retarder acts as a ¼ wavelength plate for the linearly polarized laser light, so that the light components transmitted and reflected by polarizing beam splitter 22 become nearly equal. Thus, it is shown that a ¼ wavelength plate is formed of films 11 and 12 when their optical axes are disposed about 40° apart.

Figure 6:
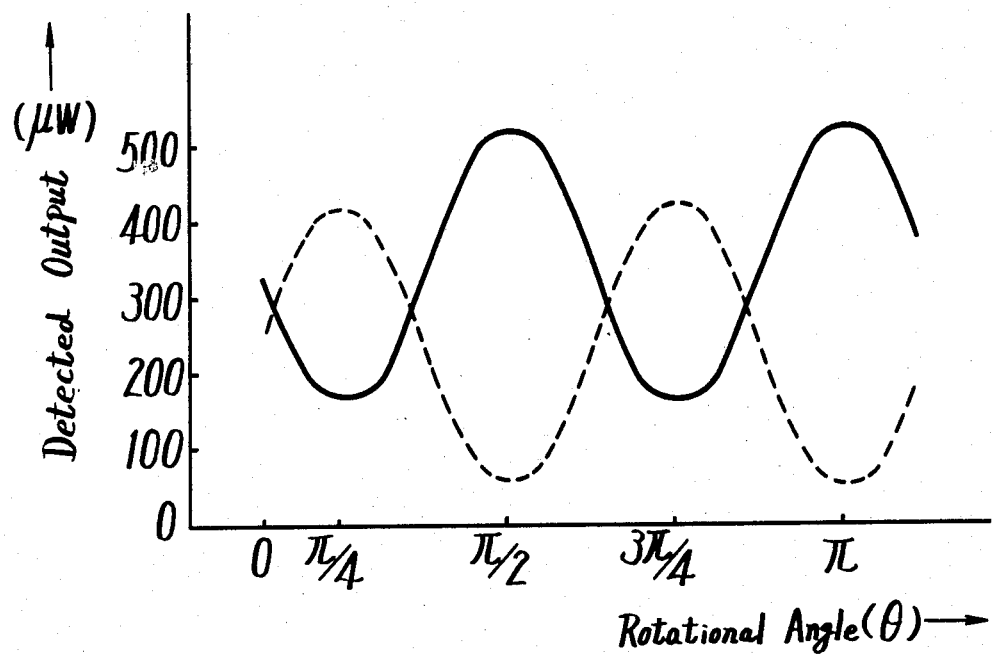
FIG. 6 is a graph showing the outputs of the apparatus of FIG. 4 with the optical axes of two sheets having an angle of 0° between them.
Figure 7:
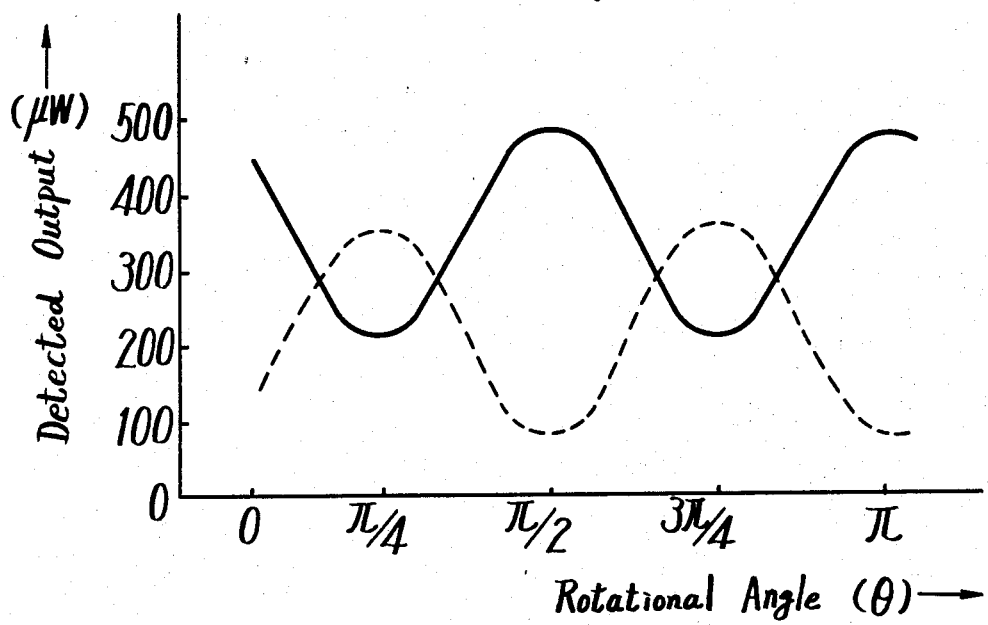
FIG. 7 is a graph similar to FIG. 6 except with the optical axes of the two sheets displaced 30° apart.
Figure 8:
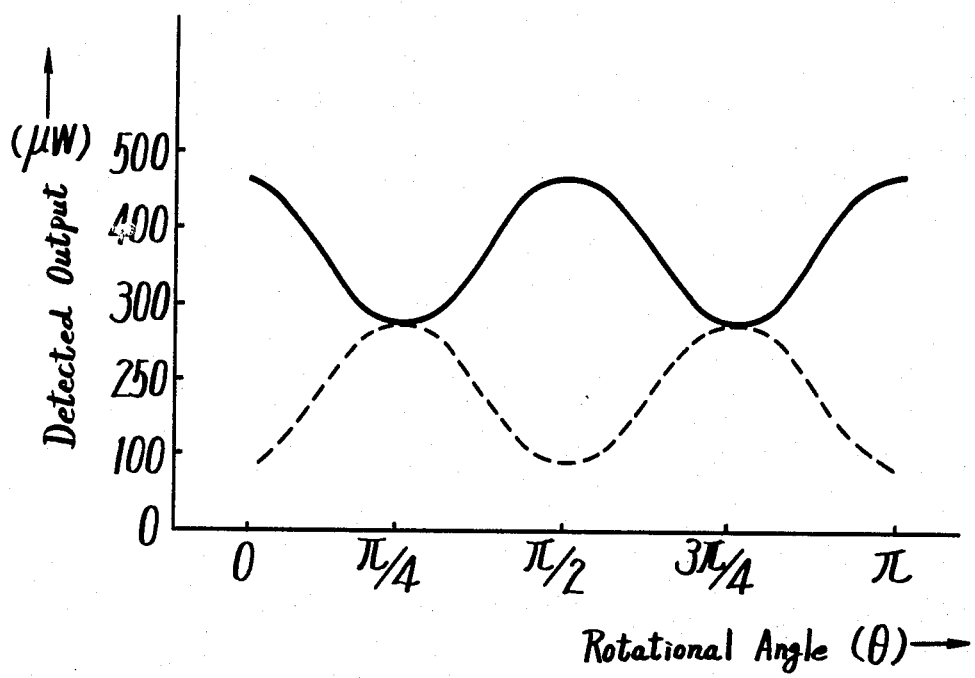
FIG. 8 is a graph similar to FIG. 6 with the optical axes of the two sheets displaced 40° from each other.
Figure 9:
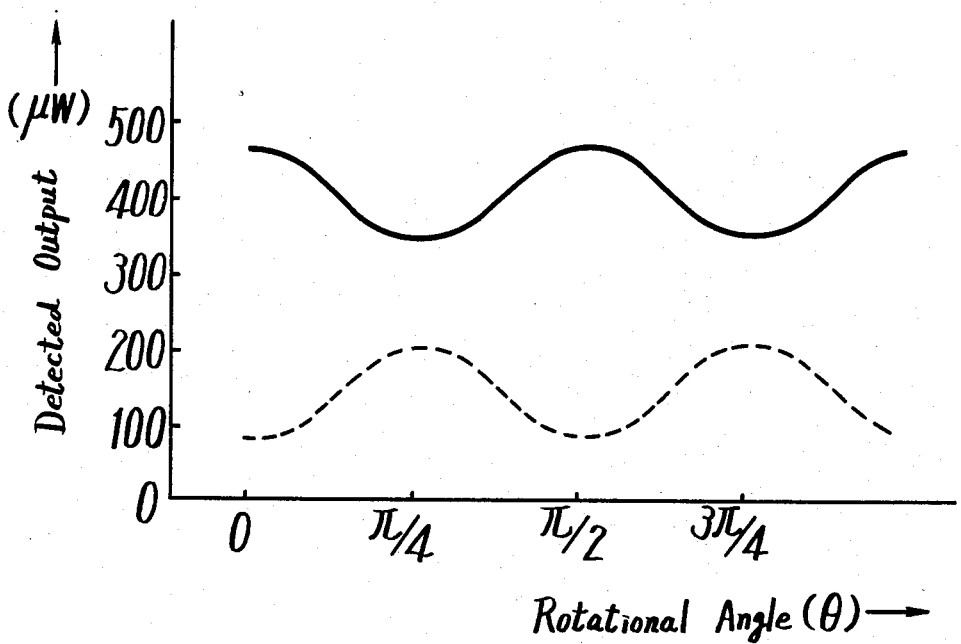
FIG. 9 is a graph similar to FIG. 6 with the optical axes of the two sheets displaced 50° from each other.
Figure 10:
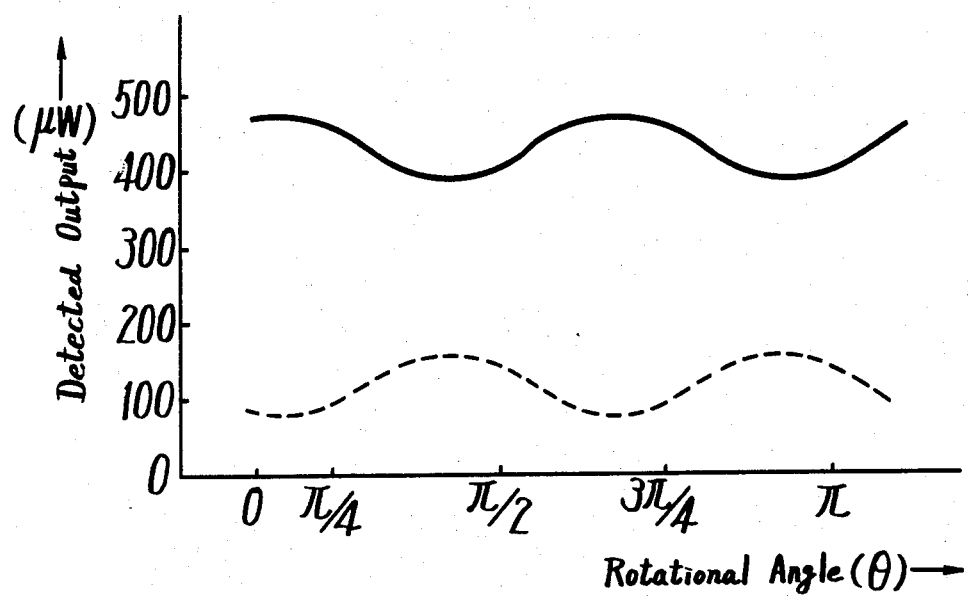
FIG. 10 is a graph similar to FIG. 6 with the optical axes of the two sheets displaced 60° from each other.
Figure 11:
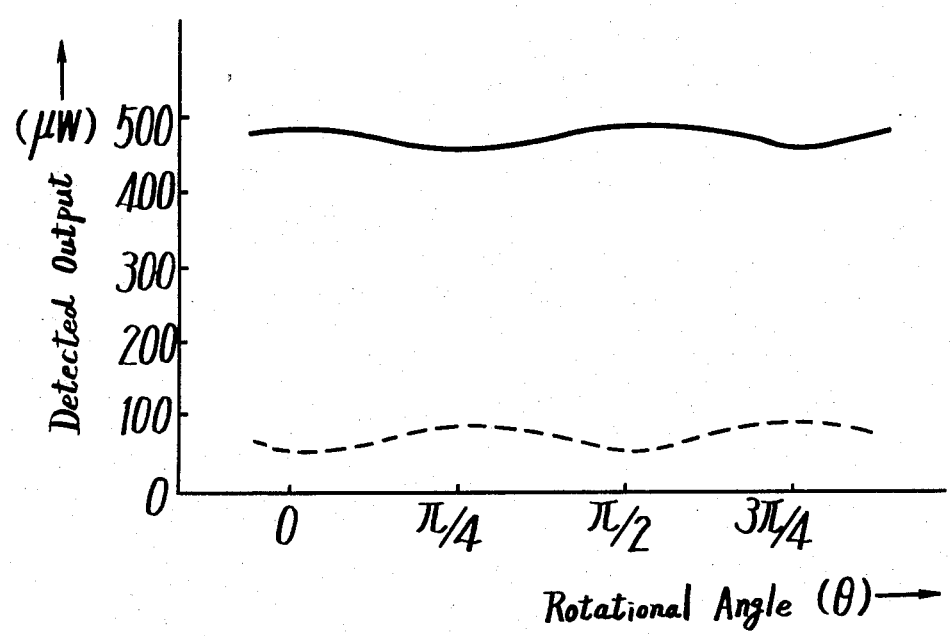
FIG. 11 is a graph similar to FIG. 6 with the optical axes of the two sheets displaced 70° from each other.
Figure 12:
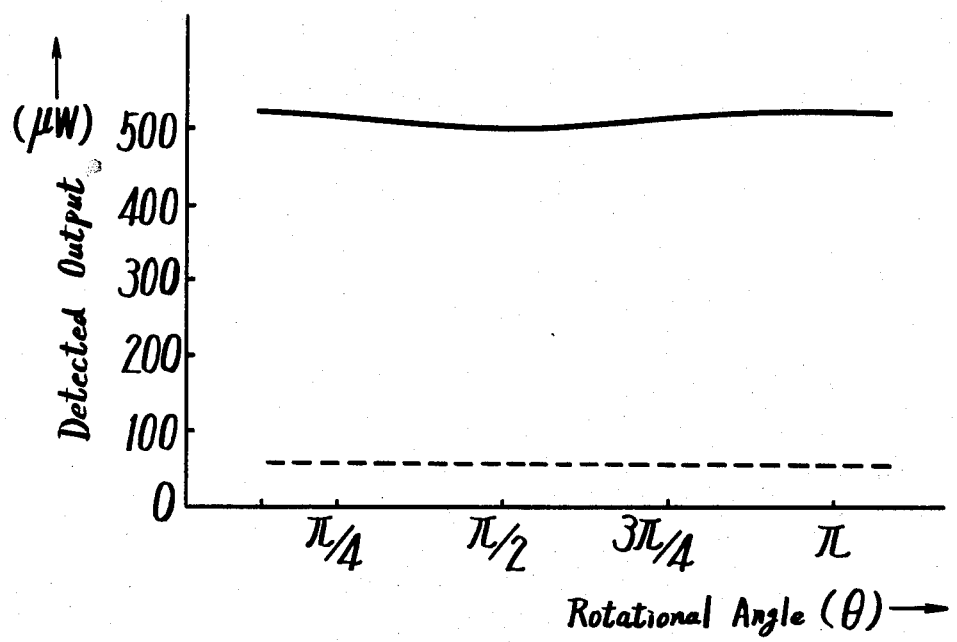
FIG. 12 is a graph similar to FIG. 6 with the optical axes of the two sheets displaced 90° from each other.
Figure 13:
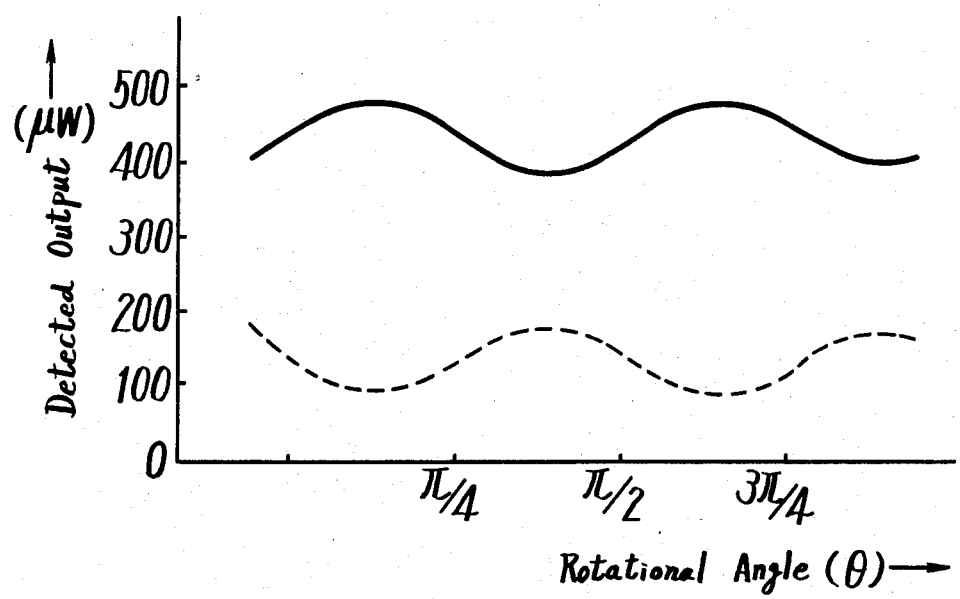
FIG. 13 is a graph similar to FIG. 6 with the optical axes of the two sheets displaced 120° from each other.

The graphs of FIGS. 6 and 7 indicate that when films 11 and 12 have their optical axes displaced 0° or 30° apart, respectively, certain rotational angles exist at which the transmitted light component and the reflected light component are equal. The rotary angle positions which accomplish this relationship appear at points where the solid line curves intersect the dashed line curves at steep angles instead of at the slowly changing angles at maxima and minima of the curves shown in the graph of FIG. 8. Therefore, in the cases shown in FIGS. 6 and 7, although angles can be found at which characteristics of a ¼ wavelength plate are observed, if the rotary angle of the wave plate retarder is deviated even a small amount about the Z-axis from the rotary angle positions at which the curves intersect, the transmitted and reflected light components are varied abruptly, and hence such a wave plate retarder ceases to function as a ¼ wavelength plate. For practical purposes, wave plate retarders having characteristics shown in FIGS. 6 and 7 require such high positioning accuracy that they are seldom used.

EXAMPLE 2

Figure 14:
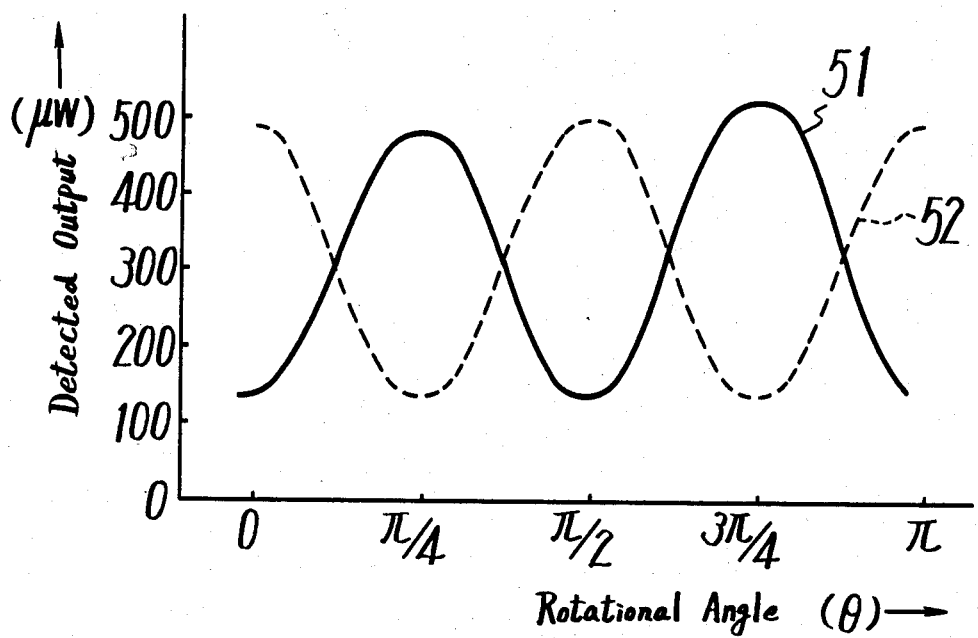
FIG. 14 is a graph showing measured outputs of a second example of a high molecular film using the apparatus of FIG. 3.
Figure 15:
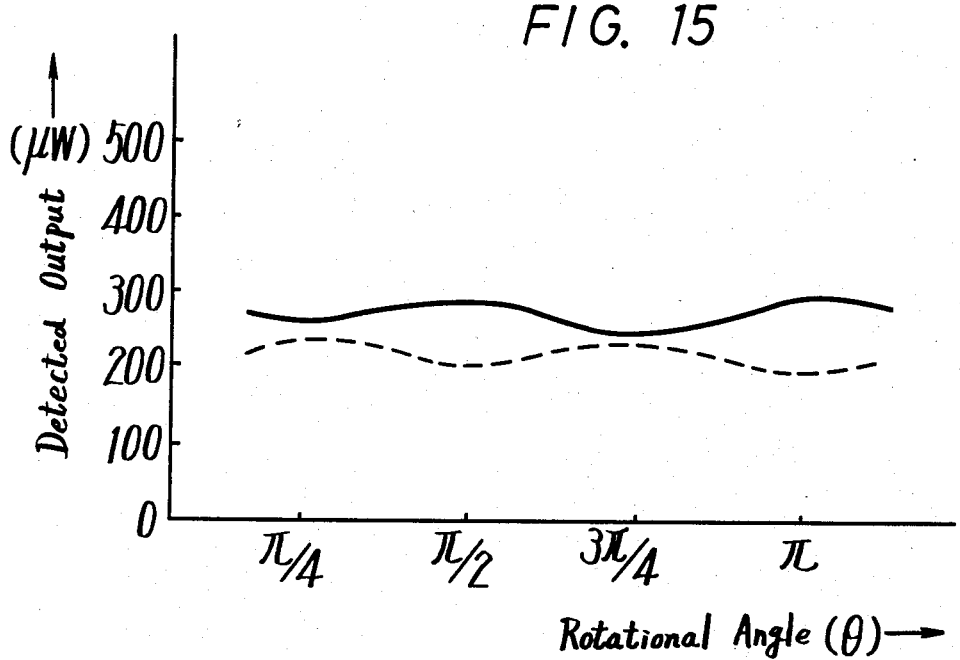
FIG. 15 is a graph showing measured output curves of the apparatus of FIG. 4 wherein two sheets of the high molecular film of the second example have their optical axes displaced 0° apart.

A high molecular film sheet of Mylar (polypropylene) with a thickness of 12 μm was used. A film 25 to be measured was cut therefrom in a manner similar to Example 1. Light transmitted and reflected by polarizing beam splitter 22 was measured by first and second detectors 23 and 24. The measured results are shown in curves 51 and 52 of FIG. 14. From the measured result, the maximum and minimum values of the transmitted light were obtained as follows:

$$(I_{out})max = 500 \mu W - 130 \mu W,$$

$$(I_{out})min = 130 \mu W - 130 \mu W = 0.$$

Figure 16:
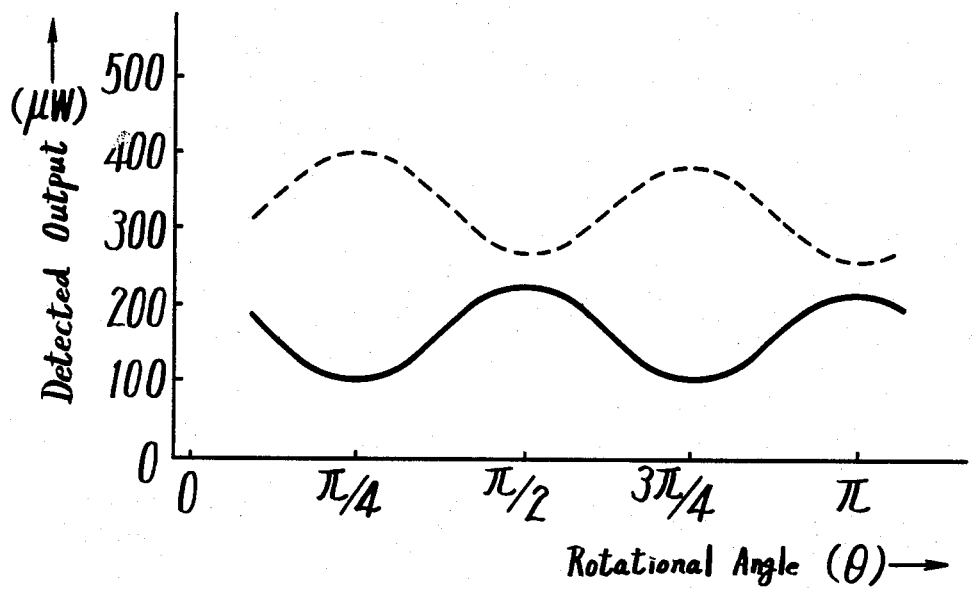
FIG. 16 is a graph showing measured output curves similar to FIG. 15 except the two sheets have their optical axes displaced 30° apart.
Figure 17:
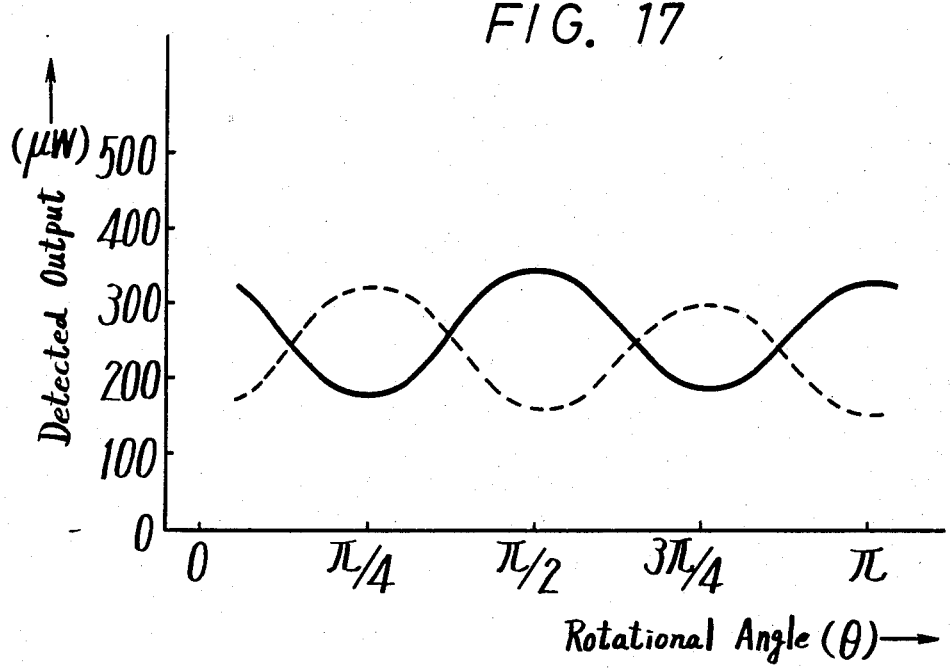
FIG. 17 is a graph showing measured output curves similar to FIG. 15 except the two sheets have their optical axes displaced 45° apart.
Figure 18:
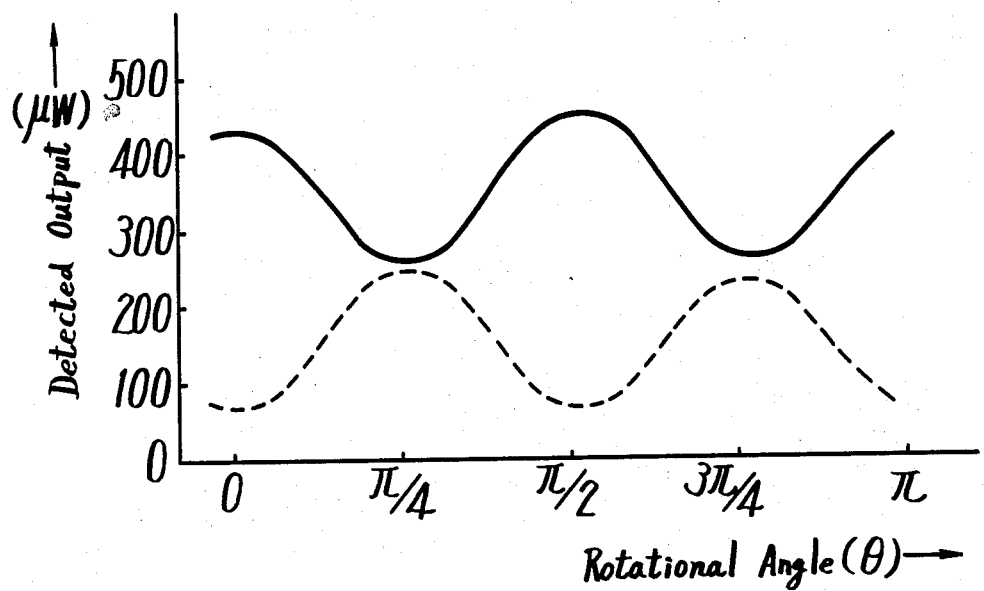
FIG. 18 is a graph showing measured output curves similar to FIG. 15 except the two sheets have their optical axes displaced 60° apart.
Figure 19:
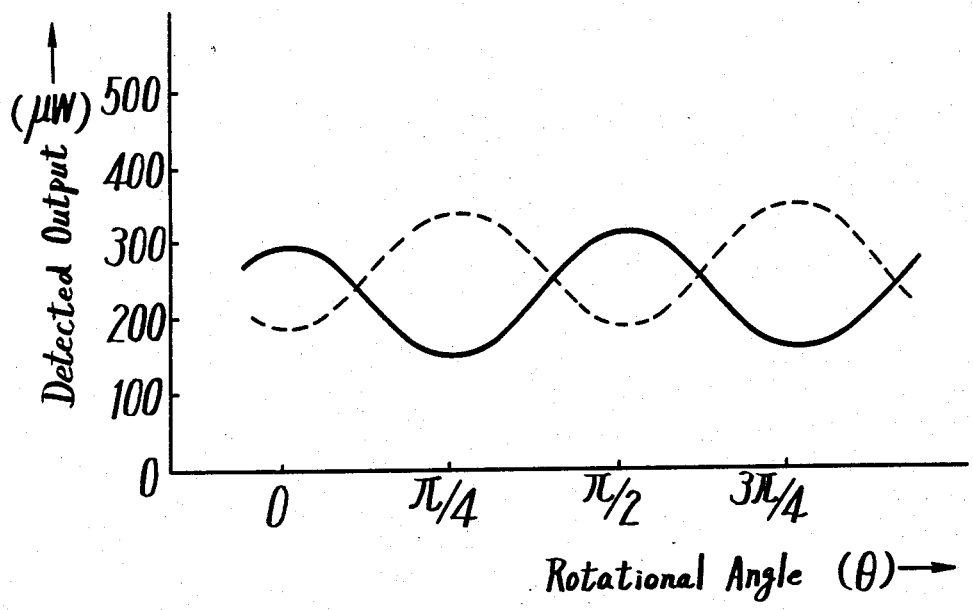
FIG. 19 is a graph showing measured output curves similar to FIG. 15 except the two sheets have their optical axes displaced 90° apart.

From equation (6), $\Gamma$ was 180°, and from equation (11), C was 67.5° and 22.5° for a ¼ wavelength plate. In this example, films 11 and 12 were cut from the Mylar sheet, and laminated into a wave plate retarder 10. Angle C was successively selected at 0°, 30°, 45°, 60° and 90°, and the relationships between the rotary angle of the films about the Z-axis and the measured outputs from first and second detectors 23 and 24 for the light components transmitted and reflected by polarizing beam splitter 22 are shown in the graphs of FIGS. 15-19 by the solid line and dashed line curves, respectively. As shown in FIGS. 16 and 18, angles of 30° and 60° (the closest values to 22.5° and 67.5°) approached the requirements for a ¼ wavelength plate.

Although the above illustrative examples of the invention are described using films 11 and 12 cut from a common film sheet and stacked with a predetermined angle between their optical axes to produce a desired retardation, it would be clear to one skilled in the art that it is also possible to produce a composite wave plate retarder according to the teaching herein by stacking more than two film sheets or by combining films which are cut from different film sheets without departing from the scope of the present invention.

Having described specific preferred embodiments of the invention with reference to the accompanying drawing it is to be understood that the invention is not limited to those precise embodiments, and that various changes and modifications may be effected therein by one skilled in the art without departing from the scope or spirit of the invention as defined in the appended claims.

What is claimed is:

1. A method of making a wave plate retarder comprising the steps of:
    placing a film of birefringent material having an optical axis with its surface normal to a linearly polarized beam of light;
    rotating said film about an axis parallel to said beam of light;
    measuring maximum and minimum values of a linearly polarized component of said beam of light after passing through said film during said rotating of the latter;
    determining a retardation phase angle from the following relationship:

$$R = \frac{1}{2}(1 + \cos \Gamma)$$

in which R is the ratio of said minimum value to said maximum value, and $\Gamma$ is the retardation phase angle for said film;

forming from said film two sheets having respective optical angles; and overlapping said two sheets with an angle C between their optical axes which is determined from the following relationship:

$$R^1 = (\tfrac{1}{2}\cos 2\Gamma - 2\cos\Gamma + 3/2)\cos^4 C + 2(\cos\Gamma - 1)\cos^2 C + 1$$

in which $R^1$ is $\tfrac{1}{2}$ for a $\tfrac{1}{4}$ wave plate retarder or $R^1$ is 1 for a $\tfrac{1}{2}$ wave plate retarder.

2. The method according to claim 1; wherein said film is polypropylene which has been uniaxially stretched during the manufacture thereof to define an optical axis parallel to the direction of stretch.

* * * * *